June 21, 1932. V. C. DUFF 1,863,839
MACHINE FOR MANUFACTURING HOLLOW CONCRETE BRICKS
Original Filed July 19, 1928 4 Sheets-Sheet 2
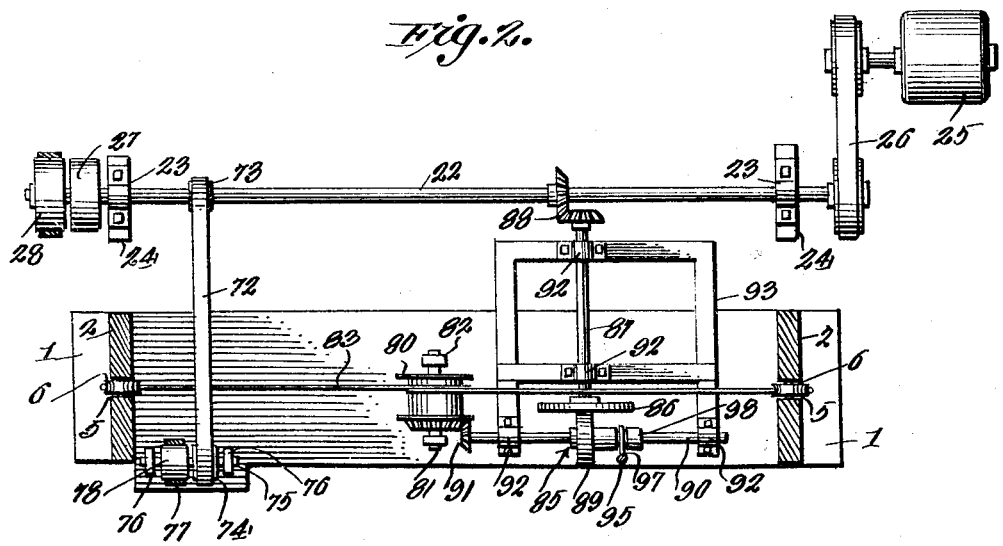
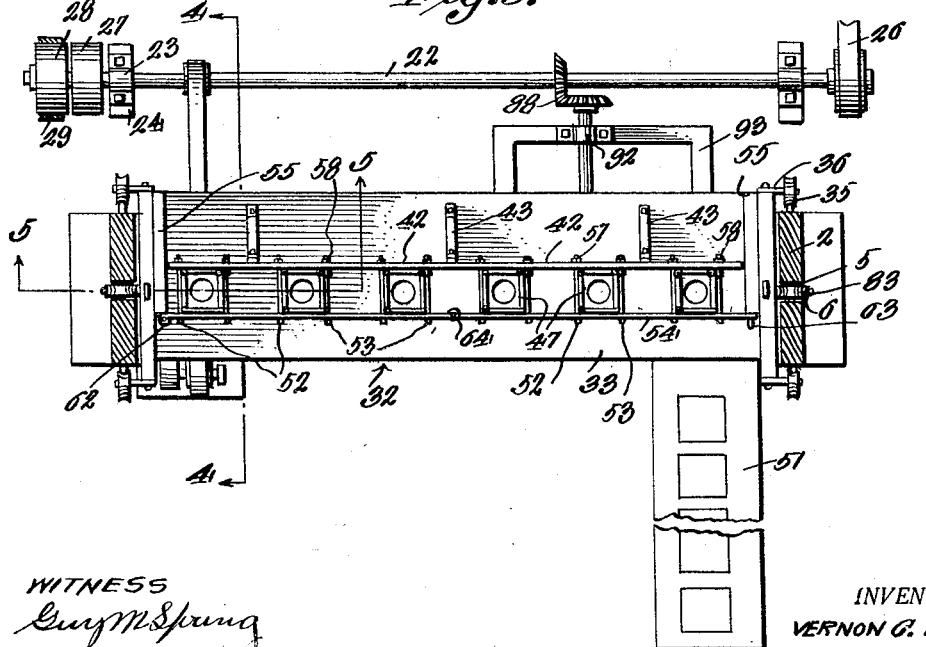
WITNESS
INVENTOR.
VERNON C. DUFF
BY
ATTORNEYS.

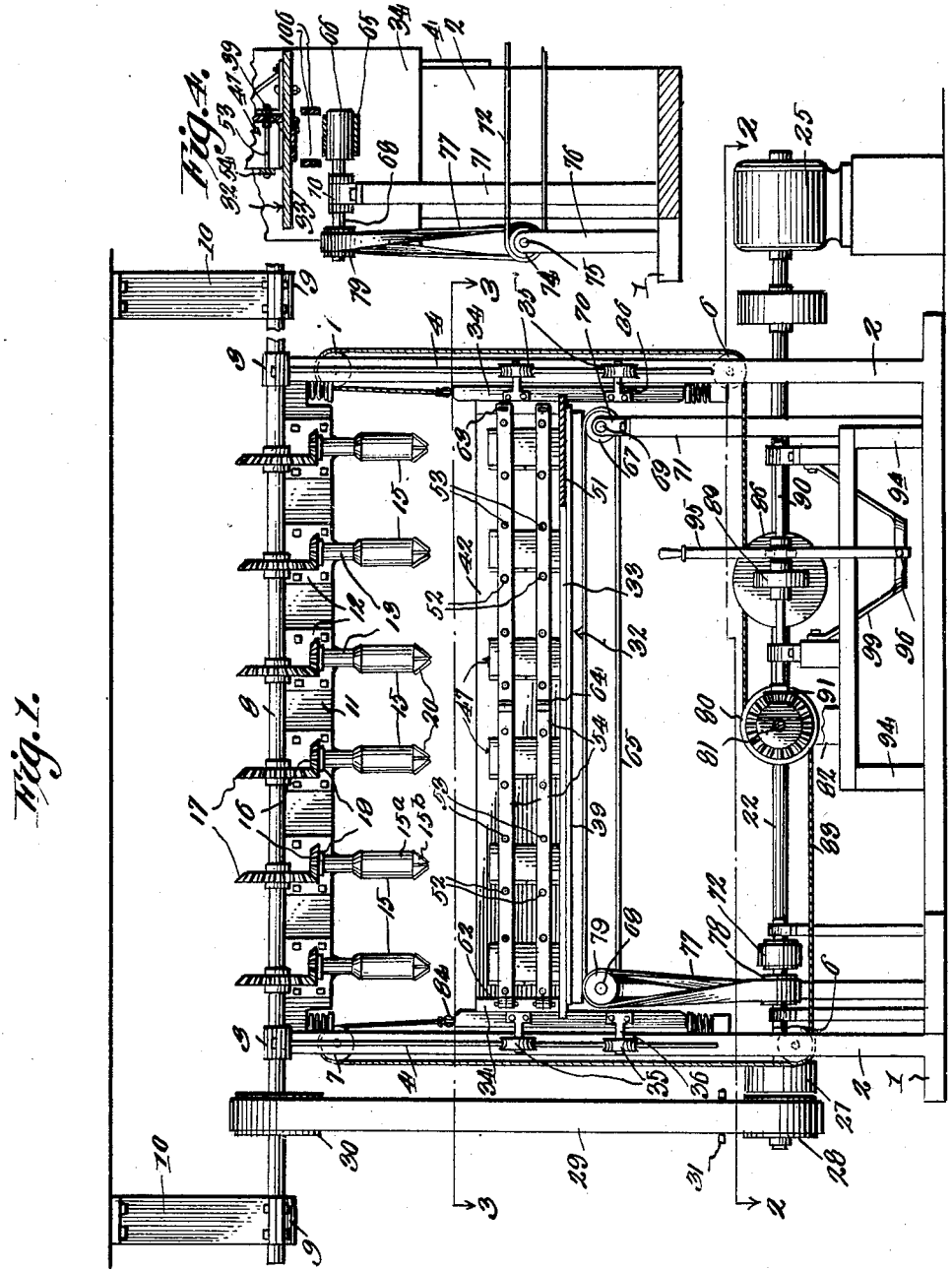

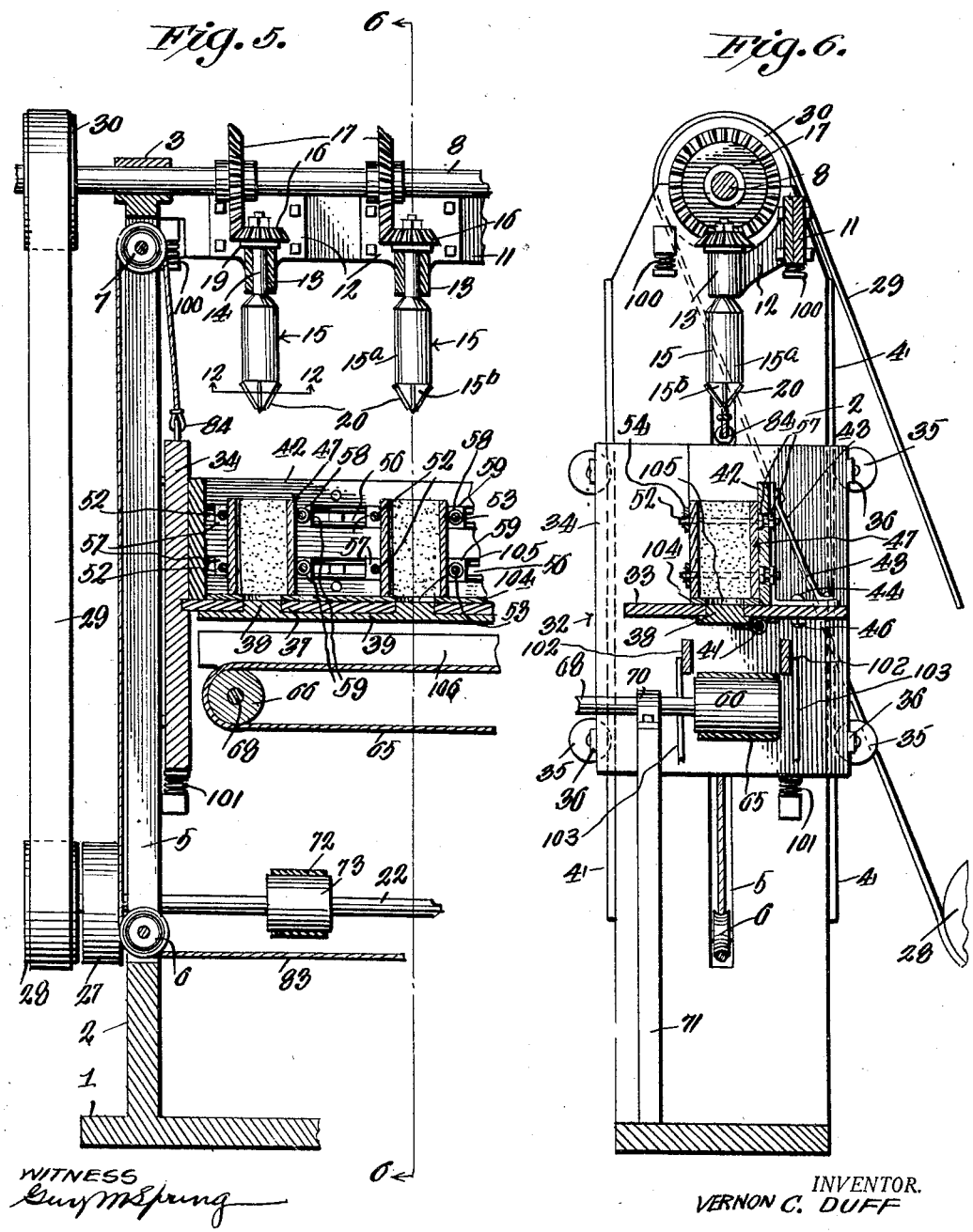

June 21, 1932.  V. C. DUFF  1,863,839
MACHINE FOR MANUFACTURING HOLLOW CONCRETE BRICKS
Original Filed July 19, 1928  4 Sheets-Sheet 4
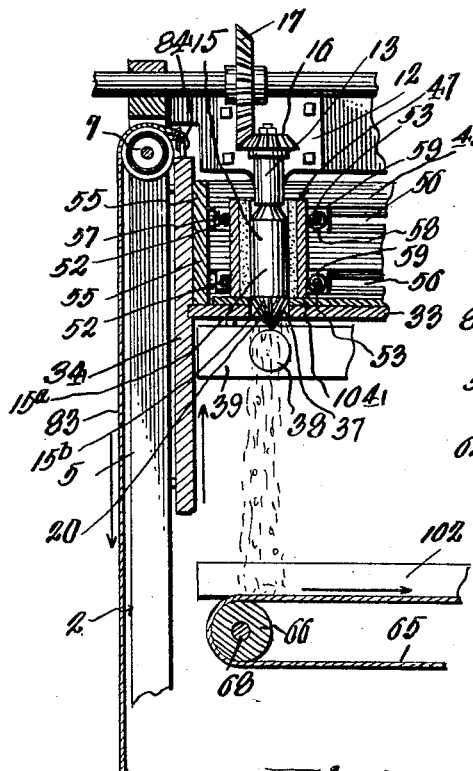
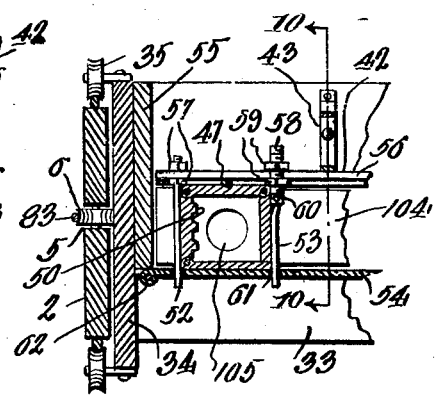
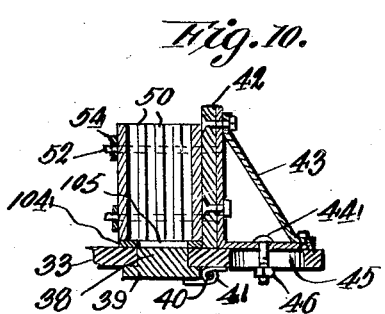
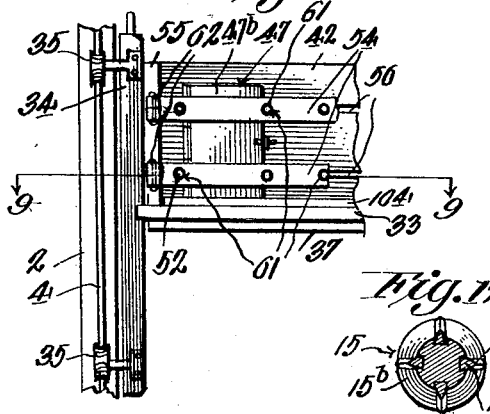
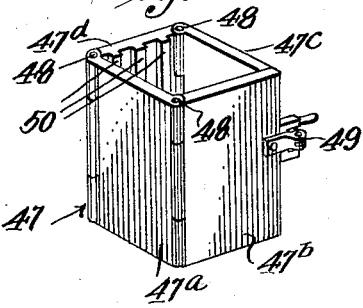
INVENTOR.
VERNON C. DUFF
BY
ATTORNEYS.

Patented June 21, 1932

1,863,839

UNITED STATES PATENT OFFICE

VERNON C. DUFF, OF WASHINGTON, DISTRICT OF COLUMBIA

MACHINE FOR MANUFACTURING HOLLOW CONCRETE BRICKS

Application filed July 19, 1928, Serial No. 293,882. Renewed September 12, 1931.

This invention relates to a machine for making hollow concrete bricks, and has for one of its objects to provide a machine of this character through the medium of which bricks of this kind may be made from solid masses of plastic concrete carried by molds.

A further object of the invention is to provide a machine of the character stated which shall be adapted to provide the masses of concrete with longitudinal passages and at the same time subject the masses to such pressure as to provide brick of the required texture and density.

A further object of the invention is to provide a machine of the character stated wherein the means for forming the longitudinal passages and providing the requisite pressure shall consist of rotatably supported members having cylindrical bodies and tapered lower ends.

A further object of the invention is to provide a machine of the character stated wherein the tapered lower ends of the passage formation and pressure members shall be provided at their conical ends with blades adapted to facilitate the passage of the members through the masses of concrete and adapted to have a troweling or packing effect on the masses during the passage of the members therethrough.

A further object of the invention is to provide a machine of the character stated which shall include a mold supporting carriage mounted for movement toward and from the boring and packing members, and manually controlled means of a simple construction for moving the carriage toward and away from the boring and packing members.

A further object of the invention is to provide a machine of the character stated wherein the carriage shall embody a construction adapted to permit the molds to be easily and quickly secured thereto and removed therefrom and adapted to permit the use of molds of different sizes.

A further object of the invention is to provide a machine of the character stated wherein the carriage shall embody a construction adapted to permit the molds to be easily and quickly secured thereto and removed therefrom and adapted to permit the use of molds of different sizes.

A further object of the invention is to provide a machine of the character stated wherein the carriage shall be provided with means for permitting the ready discharge therefrom of the material displaced from the masses of concrete and wherein means shall be provided for conveying such displaced material away from the machine.

A still further object of the invention is to provide a machine of the character stated which shall embody a novel and simple means for operating the boring and packing members.

With the foregoing and other objects in view, the nature which will appear as the description proceeds, the invention consists of the construction, combination and arrangement of parts hereinafter fully described and claimed, and illustrated in the accompanying drawings, wherein:

Figure 1 is a view in front elevation of the concrete brick making machine;

Figure 2 is a sectional view taken on the horizontal plane indicated by the line 2—2 of Figure 1;

Figure 3 is a sectional view taken on the horizontal plane indicated by the line 3—3 of Figure 1;

Figure 4 is a sectional view taken on the vertical plane indicated by the line 4—4 of Figure 3;

Figure 5 is a sectional view taken on the vertical plane indicated by the line 5—5 of Figure 3;

Figure 6 is a sectional view taken on the vertical plane indicated by the line 6—6 of Figure 5;

Figure 7 is a sectional view illustrating the manner in which the boring and packing members are caused to pass through the mass of concrete and the manner in which the displaced material for the masses of concrete is conveyed away from the machine;

Figure 8 is a view in front elevation of a fragmentary portion of the frame and carriage of the machine;

Figure 9 is a sectional view taken on the horizontal plane indicated by the line 9—9 of Figure 8;

Figure 10 is a sectional view taken on the vertical plane indicated by the line 10—10 of Figure 9;

Figure 11 is a detail perspective view of one of the molds, and

Figure 12 is a sectional view taken on the horizontal plane indicated by the line 12—12 of Figure 5.

The machine comprises a base 1 of elongated rectangular formation in plan, and standards 2 secured to the ends of the base. The standards 2 are provided at their upper ends with bearings 3, are provided at their side or front and rear edges with guide ribs or tracks 4, and are provided centrally between said edges with vertical grooves 5. Lower pulleys 6 and upper pulleys 7 are journaled in the grooves 5.

A horizontal shaft 8 is journaled in the bearings 3. Additional bearings 9 may be provided for the shaft 8, and these bearings are carried by the hangers 10 secured to the ceiling of the room in which the machine is located. A bar 11 is secured to and between the standards 2 in rear of the shaft 8. Brackets 12 are secured to and extend forwardly from the bar 11, and are provided in their front ends with bearings 13 which are vertically arranged and located directly below the shaft 8. The spindles 14 of vertically arranged boring and packing heads 15 are journaled in the bearings 13, and are provided in their upper ends with beveled gears 16 which mesh with beveled gears 17 fixed to the shaft 8. Collars 19 fixed to the spindles 14 and resting upon the bearings 13 rotatably support the boring and packing heads 15 in the bearings. The boring and packing heads 15 comprise cylindrical bodies 15a and conical lower ends 15b. Packing and troweling blades 20 are secured to the conical ends 15b of the boring and packing heads 15, are arranged in equally spaced relation thereon and have their outer edges arranged in parallel relation to the outer surfaces of said ends. The blades 20 are of triangular formation in cross section, and are removably mounted in similar grooves 21 formed in the conical ends 15b of the boring and packing heads 15.

A main drive shaft 22 is arranged in rear of the main frame of the machine which latter part consists of the base 1 and standards 2. This shaft is journaled in bearings 23 which are carried by standards 24, and it is driven from an electric or other suitable motor 25 through the medium of a belt 26. A loose pulley 27 and a fixed pulley 28 are carried by the shaft 22, and a belt 29 passes about the fixed pulley and a pulley 30 fixed to the shaft 8. A belt shifter 31 of any well known or appropriate construction is provided to permit the belt 29 to be shifted from one of the pulleys 27 and 28 to the other. When the motor 25 is in operation and when the belt 29 is in operative position with respect to the pulley 28, the boring and packing heads 15 are, as will be readily understood, driven in a common direction and at the same speed.

A carriage 32 which comprises a horizontally arranged bed plate 33 and vertically arranged heads 34, is positioned between and connected to the standards 2 for upward and downward movement with respect to the boring and packing heads 15. The heads 34 are secured to the ends of the bed plate 23 and extend above and below the same. The carriage 32 is slidably connected to the standards 2 and held against any rocking or tilting movement thereon by grooved rollers 35 carried by the heads 34 and arranged in rolling contact with the guide ribs or tracks 4. The rollers 35 are arranged above and below the bed plate 33 and forwardly and rearwardly beyond the same, and are journaled on shafts 36 secured to the heads 34. The bed plate 33 is provided with openings 37 which are arranged in axial alignment with the boring and packing heads 15. These openings are normally closed by plugs or stoppers 38 which are carried by a board 39. This part is hinged, as at 40, to the under side of the bed plate 33, and is yieldingly held by springs 41 against the under side of the bed plate 33 which holds the plugs or stoppers 38 within the openings 37.

The carriage 32 also comprises a back plate 42 which extends upwardly therefrom and is secured thereto for forward and rearward adjustment thereon. The means for securing the back plate 42 to the bed plate 33 comprises brackets 43 which are secured to the back plate and rest upon the bed plate, and bolts 44 which are carried by the brackets 43 and pass through slots 45 formed in the bed plate 33. The slots 45 extend forwardly and rearwardly of the bed plate 33, and the bolts 44 are provided with nuts 46 to permit the back plate 42 to be secured in its adjusted position. The back plate 42 is arranged rearwardly of the openings 37, and is adjustable toward and from the openings to adapt the carriage for the reception of molds of different sizes.

The molds 47 are of rectangular formation with their upper and lower ends fully open. The sides 47a, 47b, 47c and 47d of the molds 47 are hinged together, as at 48, and the adjacent edges of the sides 47b and 47c are connected together by a latch 49 so as to permit the molds to be readily opened when it is desired to remove the bricks therefrom. The molds 47 may each be provided at the inner surface of one of its sides with ribs 50 which are arranged in relatively spaced relation and extend from the upper to the lower end of the mold. These ribs and grooves provide the bricks with grooved plaster or mortar beds. The molds 47 are filled from an overhead bin or conveyor, not shown, while arranged on a table 51 which is located at the right side of and extends forwardly from the machine. After being filled, the molds are arranged upon the bed plate 33 of the carriage 32 in contact with the back plate 42 and in axial alignment with the openings 37. The molds 47 are secured against any forward, rearward or sidewise movement by the back plate 42, arms 52 carried by the back plate 42 and contacting with certain lateral sides of the molds, arms 53 carried by the back plate and contacting with the other sides of the molds, and bars 54 secured to blocks 55 and engaging the arms 52 and 53 and contacting with the front sides of the molds. The back plate 42 is provided with longitudinally extending slots 56 for the reception of the bolts 52 and 53, the slots permitting the bolts to be adjusted longitudinally of the back plate 42. The arms 52 pass through the slots 56 for adjustment forwardly and rearwardly with respect to and in the direction of the length of the back plate 42, and are secured in adjusted position by nuts 57. The arms 53 are carried by sleeves 58 which extend through the slots 56 for adjustment in the direction of the length of the back plate 42 and for adjustment forwardly and rearwardly with respect to the back plate and are secured in adjusted position by nuts 59.

The arms 53 are smaller transversely than the corresponding inner dimensions of the sleeves 58 and are secured to the sleeves by pivots 60 so as to permit them to be swung away from the molds 47 and thus permit the easy removal of the molds from the carriage 32. The bars 54 are provided with openings 61 for the reception of the front ends of the arms 52 and 53 and assist the nuts 57 and 59 in holding the arms against the opposite sides of the molds 27. The bars 54 are hinged, as at 62, to one of the blocks 55, and are connected to the other block by a latch 63. To facilitate their movement into arm engaging and arm releasing position, the bars 54 are made of sections and the sections are hinged together, as at 64.

A belt 65 is mounted on pulleys 66 and 67 which are fixed to shafts 68 and 69 journaled in bearings 70 carried by standards 71. The belt 65 is driven from the main shaft 22 by a belt 72 which passes about a pulley 73 fixed to the main shaft and a pulley 74 fixed to a shaft 75 journaled in bearing standards 76. A belt 77 passes about a pulley 78 fixed to the shaft 75 and about a pulley 79 fixed to the shaft 68.

The means for raising and lowering the carriage 32 comprises a drum 80 carried by a shaft 81 journaled in bearing standards 82, and a cable 83 wound reversely about the drum and passing in opposite directions therefrom to the lower pulleys 6. The cable 83 passes upwardly from the lower pulleys 6 to the upper pulleys 7, and it then passes downwardly from the pulleys 7 to the heads 34 of the carriage 32, the cables being secured to the heads, as at 84. The drum 80 is driven from the main shaft 22 through the medium of a friction gearing 85. The friction disc 86 of the gearing 85 is fixed to a shaft 87 which is connected to the main shaft 22 by bevel gears 88. The friction pinion 89 of the gearing is slidable on a shaft 90 which is connected to the drum 80 by beveled gears 91. The shafts 87 and 90 are journaled in bearings 92 carried by a frame 93 supported in horizontal position above the base 1 by blocks 94.

The friction pinion 89 is adapted to be moved on the shaft 90 into a neutral or elevating or lowering position with respect to the friction disc 86, and this may be easily done through the medium of a hand lever 95 which is pivoted at its lower end as 96 and is provided with a fork 97 engaging in the annular groove 98 of the friction pinion 89. The lever 95 is pivoted to a bracket 99 which is secured to and depends from the frame 93. To bring the carriage to a stop without jar, after it has completed its upward and downward movements, spring bumpers 100 are secured to the standards 2 for contact by the upper ends of the heads 34 and similar bumpers 101 are secured to the standards for contact by the lower ends of the heads.

The bed plate 33 of the carriage 32 and the mold filling table 51 are, when the carriage is in its lowered position, arranged in a common plane, so as to permit the filled molds to be slid from the filling table onto the bed plate. After the molds are locked in the carriage 32, the friction pulley 89 is moved from its neutral position with respect to the friction disc 86 into a position which will rotate the drum 80 in a direction to raise the carriage 32. During the final phase of the upward movement of the carriage 32, the rotating boring and packing heads 15 pass through the solid masses of plastic concrete in the molds 47. After the passage of the boring and packing heads 15 through the masses of concrete, the friction pulley 89 is moved into a position with respect to the friction disc 86 which will result in the rotation of the drum in a direction to effect the lowering of the carriage 32. When the carriage 32 reaches its lowered position, the molds 47 are removed therefrom and opened to permit the removal of the bricks.

As the result of the passage of the boring and packing heads 13 downwardly through the solid masses of concrete in the molds 47, the concrete masses are provided with longitudinally extending openings and such radial pressure is brought to bear upon the concrete masses as to provide bricks having a dense and uniform texture. This texture results from the crowding of the concrete masses between the boring and packing heads 15 and the sides of the molds 47, from the centrifugal force exerted on the concrete masses as the result of the rotation of the boring and packing heads, and as the result of the troweling and packing action of the blades 20. The material displaced from the concrete masses passes downwardly through the openings 37 in the bed plate 33, the board 39 and its plugs 38 yielding downwardly under the pressure applied thereto and permitting the displaced material to fall upon the conveyor belt 65 which is arranged below and extends longitudinally of the carriage 32. The belt 65 conveys the displaced material from one end to the other of the machine, and means, not shown, may be provided for conveying the material from the belt back into the mixer for the concrete.

The material from which the bricks are made is so densely and uniformly compressed by the boring and packing heads 15, that the bricks will not break down when removed from the molds 47. After they are removed from the molds 47 the bricks are placed in a drying or curing room.

Closed end bricks for use at the corners and around the openings of buildings may be made in this machine by merely limiting the upward movement of the carriage 32 so as to prevent the passage of the boring and packing heads 15 entirely through the masses of concrete.

Guide boards 102 are arranged at the opposite sides of the upper run of the conveyor 65 to prevent the lateral discharge of the material from the conveyor. The boards 102 are supported from the standards 2 by brackets 103. The carriage 32 is provided with a plate 104 which is arranged upon the bed plate 33 and provided with openings 105 which register with the openings in the bed plate. The molds 47 rest upon the plate 104. The machine may be provided with any number of these plates and the respective plates will have openings of different sizes in order to further adapt the machine for making bricks of different sizes.

As the back plate 42 may be adjusted forwardly and rearwardly on the bed plate 33, and as the arms 52 and 53 may be adjusted forwardly and rearwardly with respect to the back plate and may be adjusted relatively in the direction of the length of the back plate, it should be apparent that the carriage 32 may be readily adapted to receive molds of different sizes.

It should be apparent from the foregoing description, taken in connection with the accompanying drawings, that the machine permits a plurality of concrete blocks to be formed during each operation thereof, that the machine is strong, durable and efficient, that it may be easily controlled by one person, and that housings may be provided for the gears and other parts that should be protected from dust and other foreign matter.

While I have described the principle of operation of the invention, together with the structure which I now consider to be the best embodiment thereof, I desire to have it understood that the structure shown is merely illustrative, and that such changes may be made when desired as are within the scope of the invention and claimed.

Having thus described the invention, what I claim is:

1. A brick making machine, comprising a rotatable boring and packing head, a carriage arranged for movement toward and away from the packing head, a drum, a cable wound about the drum and extending in opposite directions from and connected to the carriage, direction pulleys about which the cable passes, and means for rotating the drum in opposite directions to effect the movement of the carriage toward and away from the head.

2. A concrete brick making machine, comprising a rotatable boring and packing head, a carriage mounted for movement toward and away from the head, a drum, a cable wound about the drum and extending in opposite directions therefrom and connected to the carriage, direction pulleys for the cable, a friction disc, a shaft geared to the drum, a friction pulley slidably fixed to the shaft and contacting with the disc, means for shifting the friction pulley and means for operating the head and shaft.

3. A concrete brick making machine, comprising standards, a boring and packing head, means rotatably supporting the head between the standards, means for rotating the head, a carriage arranged between the standards, rollers journaled on the carriage and engaging the standards, a drum arranged below the carriage, direction pulleys carried by the standards above and below the carriage, a cable wound about the drum and extending in opposite directions therefrom and connected to the carriage and passing about the pulleys, and means for rotating the drum.

4. A concrete brick making machine including a carriage embodying a bed plate, a back plate secured to the bed plate for forward and rearward adjustment with respect thereto, bars connected to the bed plate forwardly of the back plate, arms adapted to engage opposite sides of molds positioned between the back plate and bars, and means securing the arms to the back plate for forward and rearward adjustment with respect thereto and for relative adjustment longitudinally thereof, the bars being provided with openings for the reception of the front ends of the arms.

5. A concrete brick making machine, comprising a boring and packing head, a carriage, means for moving the carriage toward and from the head, a friction disc, means for rotating the friction disc, a shaft connected to said first means, a friction pinion slidably fixed to the shaft and contacting with the friction disc, and means for adjusting the friction pulley with respect to the friction disc.

6. A concrete brick making machine, comprising a rotatable boring and packing head, a carriage mounted for movement toward and away from the head and provided with an opening, a plug arranged in the opening, means yieldingly holding the plug within the opening, a mold mounted on the carriage in alignment with the opening, and means for operating the carriage.

7. A concrete brick making machine, comprising standards, a boring and packing head, means rotatably supporting the head between the standards, means for rotating the head, a carriage arranged between the standards, rollers journaled on the carriage and engaging the standards, and means for raising and lowering said carriage, as and for the purposes set forth.

8. A concrete brick making machine including a carriage embodying a bed plate, a back plate secured to the bed plate for forward and rearward adjustment with respect thereto, bars connected to the bed plate forwardly of the back plate, arms adapted to engage opposite sides of molds positioned between the back plate and bars, said arms being carried by said back plate and said bars, as and for the purposes set forth.

9. A concrete brick making machine, comprising a rotatable boring and packing head, a carriage mounted for movement toward and away from the head and provided with an opening, means for operating the carriage, and means normally covering said opening and adapted to uncover it at a predetermined time as the carriage moves toward said head, as and for the purposes set forth.

10. A concrete brick making machine, comprising a rotatable boring and packing head, a carriage mounted for movement toward and away from the head and provided with an opening, means for operating the carriage, and means normally covering said opening, said last-mentioned means being removed from the opening by said head as the carriage moves in one direction, as and for the purposes set forth.

11. A concrete brick making machine, comprising standards, a boring and packing head, means rotatably supporting the head between the standards, means for rotating the head, a carriage arranged between the standards, said carriage including an elongated vertically extending head at each end thereof, the heads being adjacent the standards, means carried at several points on said heads and engaging said standards for holding the carriage from swinging or turning, and means for lifting and lowering said carriage, as and for the purposes set forth.

12. A concrete brick making machine, comprising standards, a boring and packing head, means rotatably supporting the head between the standards, means for rotating the head, a carriage arranged between the standards, said carriage including an elongated vertically extending head at each end thereof, the heads being contiguous to said standards, shafts fixed upon said heads at several points and extending beside the standards, rollers on said shafts engaging said standards, means for lifting and lowering said carriage, and spring bumpers positioned in the line of movement of said heads, as and for the purposes set forth.

In testimony whereof I affix my signature.
VERNON C. DUFF.